Oct. 22, 1968 G. R. REID 3,407,374

ELECTRICAL CONNECTOR

Filed March 7, 1966 2 Sheets-Sheet 1

INVENTOR
GILBERT R. REID

BY [signature]
AGENT

United States Patent Office 3,407,374
Patented Oct. 22, 1968

3,407,374
ELECTRICAL CONNECTOR
Gilbert R. Reid, Norristown, Pa., assignor to Sperry Rand Corporation, New York, N.Y., a corporation of Delaware
Filed Mar. 7, 1966, Ser. No. 532,140
8 Claims. (Cl. 339—17)

ABSTRACT OF THE DISCLOSURE

This invention comprises a plurality of flexible, contact fingers which are positioned upon an insulating substrate. The opposite terminal ends of the contact fingers extend over the opposite edges of the substrate. The ends at one terminal may be bowed and grooved to facilitate connection to a wire memory element. The ends at the remaining terminal are left exposed for connection to associated apparatus as by soldering. An electrical insulating pressure plate is then secured over the frame holding the substrate, the contact fingers and the plated wires in order to provide the necessary contact pressure. Modification to the connector design permit the forming of a socket to receive a printed circuit board.

This invention relates to electrical connectors and while not limited thereto, it is more particularly related to electrical connectors for interconnecting high density closely arrayed electrical circuit elements.

In this day of integrated circuitry or electrical circuit miniaturization it has become increasingly difficult, as circuits become smaller and smaller and more densely packed, to effect good electrical connection thereto of circuit components, or even interconnection of circuit elements therein.

The present invention overcomes these difficulties by providing a flexible connecting device, capable of being inexpensively produced with a broad range of contact spacing, from ultra-miniature to ultra large or random spacing. The device lends itself to fabrication by inexpensive mass production methods without highly skilled help.

In accordance with the above, the invention comprises a plurality of flexible, self supporting high quality contact elements bonded to a thin flexible substrate of electrically insulating material with the opposite ends of the contacts freely extending beyond the substrate for individual flexibility and connection to associated apparatus. Terminal ends of the contacts preferably are formed to facilitate such connections.

Figure 6:
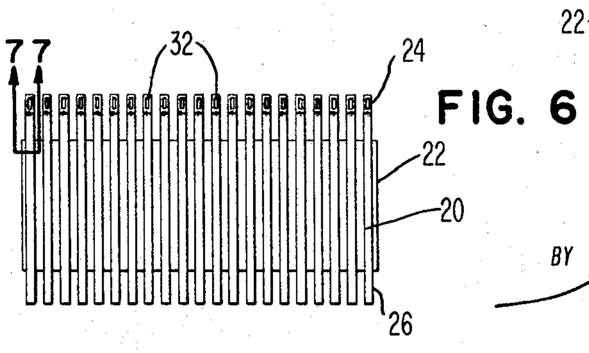
Figure 8:
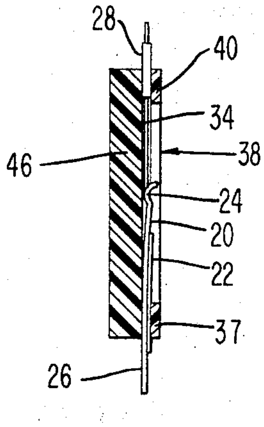
FIG. 8 is a sectional view taken along the line 8—8 of FIG. 1.

First with reference to FIG. 6 it is seen that the preferred form of the connector comprises a plurality of electrical contact elements 20 bonded to and arranged in closely spaced parallel relationship on a substrate 22 with their opposite terminal ends 24 and 26 extending beyond opposite edges of the substrate. In this form of the invention, the ends 24 are bowed, see FIG. 8, to facilitate connection to the associated apparatus 28 such as a plated wire memory plane of the type described in applicant's copending application Ser. No. 426,050, filed Jan. 18, 1965, and assigned to the same assignee as the present invention.

Figure 7:
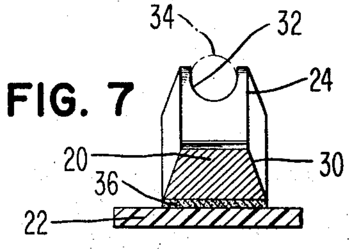
FIG. 7 is an enlarged sectional view taken along the line 7—7 of FIG. 6.

In the preferred form of the invention, the contacts are formed of beryllium-copper .006" thick, and of any desired width. As seen in FIG. 7 the sides 30 slope outwardly from the top of the contact, downwardly to a wider base. Each end 24 is provided with a shallow groove 32 at the top of its bow to facilitate alignment with and connection to the wires 34 of the memory device 28. The contacts are bonded to a .002" thick electrically insulating flexible substrate 22 of Du Pont's Mylar polyester film by a .001" coating of polyester adhesive 36, such as manufactured by Du Pont as "46971 Adhesive."

Figure 1:
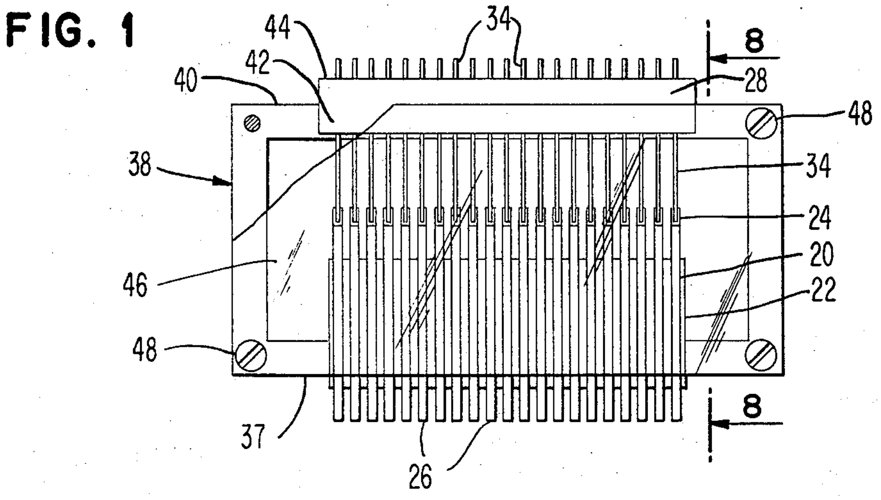
FIG. 1 is a plan view of apparatus embodying a connector in accordance with the present invention.

The contacts are arranged on .015" centers to correspond to the spacing of the wires 34 in the memory device. In its use for the purpose of interconnecting wires 34 with associated apparatus, as seen in FIG. 1 the connector is arranged over one side 37 of a frame 38 with the bowed ends 24 extending toward the opposite side 40 and facing upwardly, as illustrated. Then edge 42 of the wire carrier 44 is aligned along the opposite side 40 of the frame member with each of the wire ends resting in one of the grooves 32. An electrically insulating pressure plate 46, shown here as transparent, to facilitate illustration, is then secured over the frame by suitable means, such as screws 48, thus to provide the necessary contact pressure (see FIG. 8) and to prevent inadvertent disconnection of the mating ends. The opposite ends 26 of the connector are left exposed for connection to associated apparatus, as by welding, soldering or wire wrap.

Figure 2:
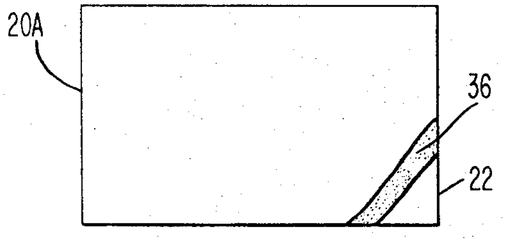
FIGS. 2 through 6 illustrate the mechanical growth of the connector as it is being formed.
Figure 3:
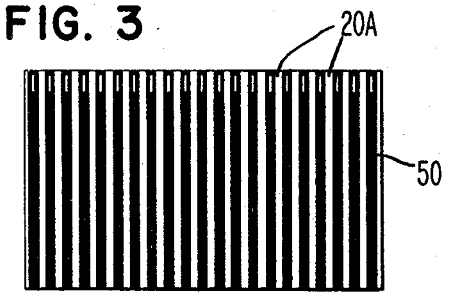
Figure 4:
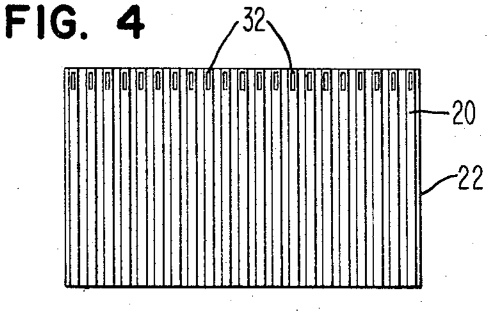
Figure 5:
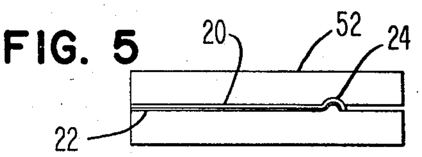

The connector readily lends itself to mass production methods and procedures, such as by the novel method described in applicant's copending application Ser. No. 532,453, filed concurrently with this application, and assigned to the same assignee. Briefly, however, as illustrated in FIGS. 2 through 6, the method comprises, bonding a sheet 20A of a suitable spring contact material (.006" beryllium-copper) on a sheet 22 of a suitable flexible insulating material (.002" Mylar polyester film) by means of a suitable adhesive 36 (.001" polyester adhesive) as seen in FIG. 2. Then the pattern and shape of the contacts is printed, or otherwise applied, to the metallic surface with an etchant resist material 50 (FIG. 3) such as Kodak Photo Resist (KPR), and the assembly is etched with a suitable etchant, such as ferric chloride, after which it is washed, leaving the contact fingers extending across the Mylar base from one side to the other (FIG. 4). To shape the bowed ends, the assembly, as seen in FIG. 5, is registered in a simple die 52 and formed. Finally the Mylar substrate is etched away with sulphuric acid at the locations (opposite ends in this case) where contact freedom is desired (FIG. 6). For best wear resistance and low electrical contact resistance, the contacts may be thin plated with nickel and then gold.

The grooves 32 are formed simultaneously with the etching by leaving an elongated slot in the resist material 50 where the groove is desired. The smaller width of this hole as compared to the wider spacing between the contact strips retards the etching at this point to permit only enough metal to be etched away to form the groove while all the metal is being etched away between the contact fingers, with ferric chloride etchant. As a result of the progressive rate of etching between the fingers, they are formed with the sloping side walls 30, as seen in FIG. 7.

Figure 9:
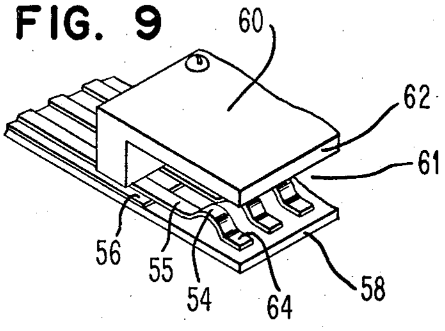
FIGS. 9 through 14 are views illustrating modifications of the connector.

The connector design lends itself to many useful modifications, such as those illustrated in FIGS. 9 through 14. In FIG. 9 the bowed contact portion 54 is slightly spaced from the ends of the contact fingers 55 and the substrate 56 is bonded to a rigid base 58. An L-shaped pressure member 60 is secured over the contacts in a manner to form a socket 61 to receive a printed circuit board (not shown) between the overhang 62 and the contact bows 54. Normally the board would be slightly thicker than the space provided for it, so that the contact ends are pressed tightly against mating contacts on the board. The forward extension 64 on the contact ends provide a bearing for the sliding movement of the contact ends as the bow is flattened by insertion of the printed circuit board.

Figure 10:
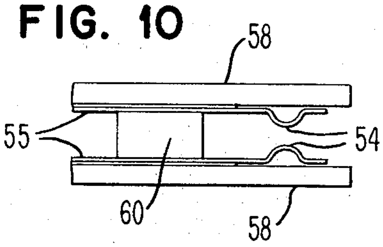

A similar construction is illustrated in FIG. 10, except that the overhang 62 is replaced by another contact assembly whereby a double faced printed circuit board may be accommodated.

Figure 11:
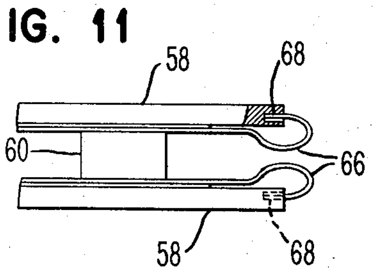

The assembly in FIG. 11 is similar to that of FIG. 10 except that the bows 54 are replaced by the loops 66, the turned back ends of which are captured in slots 68 provided in the ends of the rigid base members 58.

Figure 12:
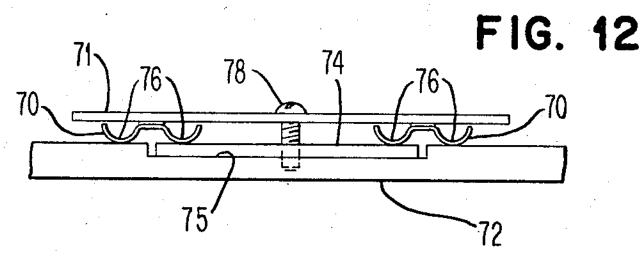

As shown in FIG. 12, a pair of connectors 70 are bonded to a rigid base 71 and employed to interconnect different circuits on a printed circuit board 72 by means of an intermediate patch board 74 positioned in a recess 75 in the board 72. In this case, both ends of the contact elements of each connector are bowed as at 76 to mate at one end with circuit elements on the printed circuit board 72 and at the other with circuit elements on the patch board 74. A common screw 78 may be used to apply the necessary contact pressure and to secure the base 71 and patch board 74 to the printed circuit board 72.

Figure 13:
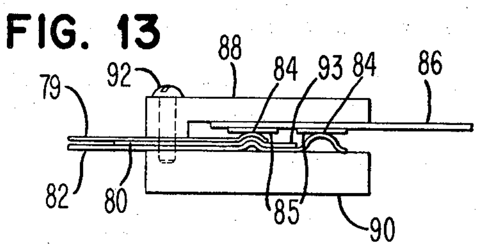

As a further illustration of the versatility of the connector, and as seen in FIG. 13, contact elements may be provided on both sides of the flexible Mylar substrate. In this case, the upper contact 79 terminates on the substrate 80 to the rear of the lower contact 82. The end bows 84 of each contact faces in the same direction to make contact with different circuit elements 85 on the printed circuit board 86 inserted in the space between the contacts and the L-shaped pressure member 88, all mounted on a rigid base 90 as by screws 92. In this case the Mylar substrate is etched only back to point 93 to prevent shorting of the two contacts.

Figure 14:
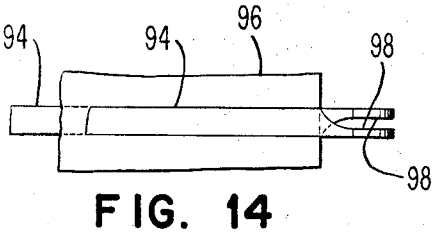

If desired, and as shown in FIG. 14, the contacts 94 on opposite sides of the substrate 96 both may extend equally beyond one edge of the substrate and yet be bowed in the same direction without interfering with each other. This is accomplished by etching away opposite sides edges of opposing contacts as indicated at 98. Both contacts 94 are used for making contact with the same side of a printed circuit board or other device.

Thus, it is seen that the present invention provides an inexpensive connector capable of being mass produced with a broad range of accurately maintained contact spacing and with a wide range of usefulness.

The embodiments of the invention in which an exclusive property or privilege is claimed are defined as follows:

1. An electrical connector comprising:
A. a thin flexible planar substrate of electrically insulating material; and
B. a plurality of elongated flexible, yet self supporting, contact elements bonded and positioned substantially parallel to at least one surface of said substrate with their opposite terminal ends extending freely beyond edges of said substrate for individual flexibility and for connection to associated apparatus.
C. terminal ends of said contact elements being bowed and grooved along their length to form pressure contact points for connection with and to receive wire elements of said associated apparatus.

2. An electrical connector according to claim 1, wherein:
A. an insulating pressure plate positioned over said electrical connector to provide required contact pressure.

3. A connector according to claim 1, wherein:
A. said contact elements are formed with side edges sloping from their top surface outwardly and downwardly to a base wider than said top surface.

4. A connector according to claim 1, wherein:
A. said substrate is an approximately .002" thick polyester sheet;
B. said contact elements are approximately .006" thick beryllium-copper; and
C. said contacts are bonded to said substrate by a polyester adhesive approximately .001" thick, and on .015" centers but spaced from each other.

5. A connector according to claim 1 wherein:
A. contact elements are provided on opposite sides of said substrate.

6. A connector according to claim 5 wherein:
A. the contact elements on one side of said substrate extend beyond those on the other side; and
B. said substrate extends beneath the formed ends of the contact elements on said other side.

7. A connector according to claim 1 wherein:
A. said substrate is bonded to a rigid base.

8. A connector according to claim 1 wherein:
A. the substrate of a pair of such connectors is bonded to opposite sides of a rigid base.

References Cited

UNITED STATES PATENTS

| | | | |
|---|---|---|---|
| 1,514,618 | 11/1924 | Ide | 339—220 X |
| 2,734,150 | 2/1956 | Beck | 174—68.5 |
| 2,944,121 | 7/1960 | Wasylenko | 339—17 X |
| 3,024,151 | 3/1962 | Robinson | 339—17 X |
| 3,034,091 | 5/1962 | Gluck | 339—17 X |
| 3,105,729 | 10/1963 | Rosenthal et al. | 339—18 |
| 3,168,617 | 2/1967 | Richter | 174—68.5 X |
| 3,239,916 | 3/1966 | Love | 339—17 X |
| 3,253,246 | 5/1966 | McConnell et al. | 339—17 |
| 3,323,095 | 5/1967 | Bush et al. | 339—18 |

OTHER REFERENCES

IBM Technical Disclosure Bulletin, Vol. 7, No. 10, March 1965, page 873, 339–17.

MARVIN A. CHAMPION, *Primary Examiner.*

PATRICK A. CLIFFORD, *Assistant Examiner.*